(12) United States Patent
Kuoch

(10) Patent No.: US 9,669,871 B2
(45) Date of Patent: Jun. 6, 2017

(54) METHOD FOR OPERATING A DRIVER ASSISTANCE DEVICE FOR AUTONOMOUSLY DRIVING A MOTOR VEHICLE AND MOTOR VEHICLE

(71) Applicant: VALEO Schalter und Sensoren GmbH, Bietigheim-Bissingen (DE)

(72) Inventor: Siav-Kuong Kuoch, Saint Maur des Fosses (FR)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 0 days.

(21) Appl. No.: 14/908,864

(22) PCT Filed: Jul. 31, 2014

(86) PCT No.: PCT/EP2014/066543
§ 371 (c)(1),
(2) Date: Jan. 29, 2016

(87) PCT Pub. No.: WO2015/014964
PCT Pub. Date: Feb. 5, 2015

(65) Prior Publication Data
US 2016/0185387 A1     Jun. 30, 2016

(30) Foreign Application Priority Data
Jul. 31, 2013   (DE) ........................ 10 2013 012 779

(51) Int. Cl.
*B60K 35/00* (2006.01)
*B60K 37/04* (2006.01)
(Continued)

(52) U.S. Cl.
CPC ............ *B62D 15/025* (2013.01); *B60K 35/00* (2013.01); *B60K 37/04* (2013.01); *B60Q 3/0293* (2013.01);
(Continued)

(58) Field of Classification Search
CPC ................ B62D 15/025; B60W 50/14; B60W 2050/0096; B60W 2050/0072;
(Continued)

(56) References Cited

U.S. PATENT DOCUMENTS 6,226,570 B1 * 5/2001 Hahn .................... B60K 28/066
701/1
8,352,110 B1 * 1/2013 Szybalski .............. B62D 1/286
701/23
(Continued)

FOREIGN PATENT DOCUMENTS

DE    10 2007 057725 A1    6/2008
DE    10 2007 060347 A1    6/2008
(Continued)

OTHER PUBLICATIONS

International Search Report issued in PCT/EP2014/066543 mailed on Oct. 27, 2014 (3 pages).
(Continued)

*Primary Examiner* — Michael J Zanelli
(74) *Attorney, Agent, or Firm* — Osha Liang LLP

(57) ABSTRACT

The invention relates to a method for operating a driver assistance device of a motor vehicle (1), wherein the driver assistance device is switched between an automatic drive mode, in which control signals are output at least to a steering device of the motor vehicle (1) by means of the driver assistance device and hereby a steering angle of the motor vehicle (1) is autonomously controlled by the driver assistance device, and a manual drive mode, in which the steering angle is manually controlled by a driver by operating a steering wheel (7) of the motor vehicle (1), wherein with the switching the driver assistance device at least in one switching direction from one of the drive modes into the other drive mode, a moving light is generated along a predetermined lighting path (20) in a movement direction
(Continued)

(21, 22) associated with the switching direction by means of a lighting device (4).

14 Claims, 2 Drawing Sheets

(51) Int. Cl.
| | |
|---|---|
| *B60W 40/08* | (2012.01) |
| *B60W 50/00* | (2006.01) |
| *B62D 15/02* | (2006.01) |
| *B60Q 3/02* | (2006.01) |
| *B60Q 3/04* | (2006.01) |
| *B60W 50/14* | (2012.01) |
| *B60Q 9/00* | (2006.01) |

(52) U.S. Cl.
CPC ......... *B60W 50/14* (2013.01); *B60K 2350/00* (2013.01); *B60K 2350/203* (2013.01); *B60K 2350/2008* (2013.01); *B60K 2350/928* (2013.01); *B60K 2350/962* (2013.01); *B60K 2350/965* (2013.01); *B60Q 3/024* (2013.01); *B60Q 3/0289* (2013.01); *B60Q 9/00* (2013.01); *B60W 2050/0072* (2013.01); *B60W 2050/0096* (2013.01)

(58) Field of Classification Search
CPC .... B60K 37/04; B60K 35/00; B60K 2350/00; B60K 2350/965; B60K 2350/928; B60K 2350/203; B60Q 3/024
See application file for complete search history.

(56) References Cited

U.S. PATENT DOCUMENTS

| | | | |
|---|---|---|---|
| 2007/0153535 A1* | 7/2007 | Bostick | B60Q 3/024 362/488 |
| 2010/0228417 A1 | 9/2010 | Lee et al. | |
| 2011/0163863 A1 | 7/2011 | Chatmon | |
| 2012/0089294 A1 | 4/2012 | Fehse et al. | |
| 2014/0109719 A1* | 4/2014 | Lisseman | B60Q 3/024 74/552 |
| 2014/0328077 A1* | 11/2014 | Tovar | B62D 1/046 362/511 |
| 2015/0070160 A1* | 3/2015 | Davidsson | B60W 50/14 340/457 |

FOREIGN PATENT DOCUMENTS

| | | |
|---|---|---|
| DE | 10 2010 041961 A1 | 4/2012 |
| DE | 10 2011 013 023 A1 | 9/2012 |
| DE | 10 2011 013808 A1 | 9/2012 |
| DE | 10 2011 112 577 A1 | 3/2013 |
| EP | 2 174 833 A2 | 4/2010 |

OTHER PUBLICATIONS

Written Opinion of the International Searching Authority issued in PCT/EP2014/066543 mailed on Oct. 27, 2014 (5 pages).
German Search Report issued in Patent application No. 10 2013 012 779.3 mailed on Jul. 17, 2014 (7 page).

\* cited by examiner

METHOD FOR OPERATING A DRIVER ASSISTANCE DEVICE FOR AUTONOMOUSLY DRIVING A MOTOR VEHICLE AND MOTOR VEHICLE

FIELD OF THE INVENTION

The invention relates to a method for operating a driver assistance device of a motor vehicle, wherein the driver assistance device can be operated in an automatic drive mode and in a manual drive mode. In the automatic drive mode, control signals are output to at least a steering device of the motor vehicle by means of the driver assistance device in order to autonomously control a steering angle of the motor vehicle by the driver assistance device. In the manual drive mode in turn, the steering angle can be manually controlled by a driver by operating a steering wheel of the motor vehicle. In addition, the invention relates to a motor vehicle with a driver assistance device formed for autonomously driving the motor vehicle.

BACKGROUND

Driver assistance devices for automatically driving a motor vehicle are already known from the prior art. Therein, it is basically differentiated between fully automatic driver assistance devices on the one hand and semi-automatic driver assistance devices on the other hand. Semi-automatic driver assistance devices only assume the transverse guidance of the motor vehicle by automatically controlling the steering angle of the motor vehicle by means of the driver assistance device. In contrast, fully automatic driver assistance devices additionally control the drive train of the motor vehicle and thus also assume the longitudinal guidance of the motor vehicle, i.e. the acceleration and the deceleration. Presently, the interest is directed to an at least semi-autonomous driver assistance device, which outputs control signals at least to a steering device of the motor vehicle in the automatic drive mode in order to automatically control the steering angle. The driver assistance device can also be a fully automatic device, which additionally outputs corresponding control signals to a drive train of the motor vehicle. Therefore, the term "autonomous" can presently include both "semi-autonomous" and "fully automatic".

In this context, for example, automatic parking assistance systems are known, which assist the driver in parking the motor vehicle. These driver assistance systems usually calculate a parking trajectory, along which the motor vehicle can be parked into a previously detected parking space without collision. The driver assistance device then autonomously controls the motor vehicle into the parking space according to the pre-calculated parking trajectory. In addition, systems are also known, which serve for automatically driving the motor vehicle in preset road situations or driving situations. For example, it is already prior art to automatically drive a motor vehicle in a congestion or else in a so-called convoy travel.

Such driver assistance devices overall pursue a common aim of providing the possibility to the driver of the automobile of relaxing during travel and for example using diverse multimedia systems. Therein, the driver himself can also assume the control over his vehicle anytime, as it is for example described in the documents US 2010/0228417, DE 10 2011 013 023 A1 as well as US 2012 089 294. These printed matters propose various methods, how the driver can again assume the control over his vehicle. Usually, therein, only the steering wheel has to be operated by the driver.

If a motor vehicle is automatically driven by means of a driver assistance device, thus, it is required in certain events to pass the control over the vehicle again to the driver. This is for example required if a risk of collision is detected or else if the environmental conditions fast change and for example rain is detected. However, the communication between the driver assistance device and the driver has proven problematic in such situations. If the control over the vehicle is again to be passed to the driver, this is to be correspondingly signaled to the driver, namely such that the driver is able to particularly fast and reliably conceive or appreciate the intent of the driver assistance device to surrender the control over the motor vehicle. This has proven difficult in the prior art in particular for the reason that the driver usually does not focus on the current road situation during automatic drive of the motor vehicle, but for instance on infotainment systems and the like. Thus, a particular challenge is in being able to direct the attention of the driver again to assumption of the control over his vehicle.

From the printed matter US 2011/0163863 A1, a device is known, which detects whether or not the steering wheel of the motor vehicle is operated by the driver. If operation of the steering wheel by the driver is not detected during movement of the motor vehicle, thus, alarm signals are output.

A driver assistance device for automatically driving a motor vehicle is known from the printed matter DE 10 2011 112 577 A1. Therein, by means of a lighting device, the direction is indicated, in which the motor vehicle moves in the current automatic drive maneuver.

SUMMARY OF THE INVENTION

It is an object of the invention to demonstrate a solution, how in a method of the initially mentioned kind, the driver can be particularly effectively and reliably made aware of switching of the driver assistance device from one of the drive modes into the other drive mode.

According to the invention, this object is solved by a method as well as by a motor vehicle having the features according to the respective independent claims. Advantageous implementations of the invention are the subject matter of the dependent claims, of the description and of the figures.

A method according to the invention serves for operating a driver assistance device of a motor vehicle, which is switched between an automatic drive mode and a manual drive mode. In the automatic drive mode, control signals are output to at least a steering device of the motor vehicle by means of the driver assistance device, and hereby, a steering angle of the motor vehicle is autonomously controlled by the driver assistance device. Optionally, control signals can also be output to a drive train in order to also automatically control the longitudinal guidance of the motor vehicle. In contrast, in the manual drive mode, the steering angle is manually controlled by the driver himself by operating a steering wheel of the motor vehicle. According to the invention, it is provided that with the switching of the driver assistance device in at least one switching direction from one of the drive modes into the other drive mode, a moving light is generated along a predetermined lighting path in a movement direction associated with the switching direction by means of a lighting device.

Thus, the effect according to the invention is achieved in that upon switching the driver assistance device from the one drive mode into the other drive mode, a plurality of sectors of a preset path disposed one behind the other are consecutively illuminated in a preset movement direction such that the impression of a traveling light (moving light) is generated. Therein, the lighting path, along which the moving light is generated, can be disposed on the steering wheel in certain areas and outside of the steering wheel in certain areas such that light animation is provided, in which the impression is generated that the light moves from the steering wheel towards the outside of the steering wheel or in the inverse direction. Therein, the movement direction of the moving light is dependent on the switching direction of the driver assistance device, i.e. dependent on whether the driver assistance device is switched from the automatic drive mode into the manual drive mode or vice versa. In this manner, the attention of the driver can be particularly effectively and fast directed to the change between the different drive modes such that the driver can very fast react. Therein, such an approach proves particularly advantageous especially if the driver assistance device autonomously switches from the automatic drive mode into the manual drive mode and the control over the motor vehicle is to be assumed by the driver. This can be particularly fast signaled by means of the moving light.

By the term "moving light", presently, light animation is understood, in which the impression is generated as if the generated light would move along the lighting path in a preset direction. In an embodiment, to this, it can be provided that the lighting device includes a first lighting unit disposed on the steering wheel and/or a second lighting unit disposed outside of the steering wheel each having a plurality of lighting elements disposed one behind the other such that the moving light is generated by means of the first and/or the second lighting unit. The generation of the moving light is performed such that the plurality of lighting elements of the first and/or second lighting unit disposed distributed along the lighting path one behind the other are consecutively activated in order to animate the movement of the light. The first and/or the second lighting unit can therein each be provided in the form of a light strip or a lighting string, which includes multiple lighting elements disposed next to each other, which are consecutively activated for generating the moving light. Therein, one light bar can be disposed on the steering wheel, while the other light bar can be disposed outside of the steering wheel.

However, alternatively, it can also be provided that the moving light is generated with the aid of a movable projector, in particular a laser projector. Therein, the light generated by means of the projector is moved along the preset—and imagined—lighting path.

In an embodiment, it is provided that the moving light is generated along a lighting path disposed on the steering wheel and/or outside of the steering wheel, in particular on the steering wheel in certain areas and outside of the steering wheel in certain areas. Thus, the mode change can be particularly effectively signaled.

Preferably, an area of the lighting path is disposed on an interior trim part of the motor vehicle, namely in particular on a dashboard and/or on a vehicle door. This in particular means that a lighting unit disposed on the interior trim part is used as the second lighting unit. For example, this area of the lighting path can extend in vehicle transverse direction over the predominant width area—in particular also over the entire width—of the dashboard immediately below the windscreen. Upon switching the driver assistance device between the two drive modes, thus, it is conveyed the impression to the driver as if the light would move from the steering wheel to the motor vehicle itself or else in the inverse direction from the motor vehicle (dashboard) towards the steering wheel. Thus, it can be very reliably signaled if a transition from the automatic drive mode to the manual drive mode or else vice versa from the manual drive mode to the automatic drive mode currently occurs.

Thus, upon switching the driver assistance device from the manual drive mode into the automatic drive mode, the moving light can be generated in a first movement direction. In this first movement direction, the moving light is preferably moved from outside of the steering wheel (for example from the dashboard) towards the steering wheel, i.e. in particular from the mentioned second lighting unit towards the first lighting unit. Thus, animation is provided, in which the light is transmitted to the steering wheel, whereby it is signaled that the driver assistance device assumes the control over the motor vehicle.

Correspondingly, it can also be provided that upon switching the driver assistance device from the automatic drive mode into the manual drive mode, the moving light is moved in a second movement direction opposite to the first movement direction. Therein, it can be provided that upon switching the driver assistance device from the automatic into the manual drive mode, the moving light is generated from the steering wheel towards the outside of the steering wheel, i.e. in particular towards the mentioned interior trim part. If the above mentioned lighting units are employed, thus, the moving light is generated from the first lighting unit towards the second lighting unit. Thus, the impression is generated that the light moves away from the steering wheel. Thereby, the impression is conveyed to the driver as if the automatic control of the driver assistance device over the motor vehicle would be withdrawn, whereby the driver is caused to assume himself the control over the motor vehicle.

In an embodiment, upon switching the driver assistance device from the automatic drive mode into the manual drive mode, first, a transition mode is activated, in which it is checked by means of the driver assistance device whether or not the driver operates the steering wheel. If operation of the steering wheel is detected, the manual drive mode is activated. In contrast, if operation of the steering wheel is not detected, thus, the driver assistance device can continue to automatically drive the motor vehicle. In this embodiment, the moving light is generated in the transition mode. Especially in such a transition mode, it is particularly important to be able to direct the attention of the driver as fast as possible again to the control of the motor vehicle.

Therein, the activation of the transition mode is preferably effected autonomously by means of a control device of the driver assistance device. Therein, the activation of the transition mode can for example be effected depending on a degree of risk, which is determined by means of the control device depending on sensor data of a sensor device of the motor vehicle. Additionally or alternatively, the transition mode can also be activated if a preset time since the activation of the automatic drive mode has elapsed. Furthermore, additionally or alternatively, the transition mode can be activated if preset environmental conditions are detected such as for example rain or the like.

If after activation of the transition mode, the operation of the steering wheel by the driver is detected by the driver assistance device, thus, light signals of a first type different from the moving light can be output from the moving light by means of the lighting device, by which the activation of the manual drive mode and thus assumption of the vehicle control by the driver is signaled. The successful assumption of the vehicle control by the driver can for example be signaled by corresponding coloring of the light signals such as for example by blue light. In particular, therein, it can be provided that the first lighting unit disposed on the steering wheel is controlled for generating these light signals.

If after activation of the transition mode within a preset time interval, operation of the steering wheel by the driver is not detected, light signals of a second type can be output by means of the lighting device, by which the driver is requested to assume the vehicle drive. These light signals can for example have a red coloring in order to reliably make the driver aware of the change into the manual drive mode. Here too, these light signals can be output by means of the first lighting unit, which is disposed on the steering wheel.

In the automatic drive mode too, light signals of a third type can be generated by means of the lighting device, by which the activated automatic drive mode is optically signaled. These light signals can for example have a green color and thus signal that the automatic drive mode is activated at the current time and thus the driver assistance device has the control over the motor vehicle. Thus, doubts do not arise for the driver, in which operating mode the driver assistance device currently is.

Generally, the above mentioned light signals of the first type and/or the second type and/or the third type can differ from each other in their coloring and/or in their flash frequency. Thereby, light signals different from each other can be generated, which also can be differently perceived by the driver.

Optionally, by the control device, control signals can also be output to a drive train in order to also automatically control the longitudinal guidance of the motor vehicle. If also the longitudinal guidance of the motor vehicle is controlled automatically, then the transition from the manual drive mode into the automatic drive mode and/or the transition from the automatic drive mode into the manual drive mode can be signalized by means of lighting elements which are arranged on at least one pedal of the motor vehicle and/or in a bottom region of the steering wheel.

In addition, the invention relates to a motor vehicle with a driver assistance device for autonomously driving a motor vehicle, wherein the driver assistance device is switchable between an automatic drive mode and a manual drive mode and includes a control device, which outputs control signals at least to a steering device of the motor vehicle in the automatic drive mode and hereby autonomously controls a steering angle of the motor vehicle, and wherein the steering angle can be manually controlled by a driver by operating a steering wheel in the manual drive mode. The driver assistance device includes a lighting device, and the control device is adapted to control the lighting device upon switching the driver assistance device at least in one switching direction from one of the drive modes into the other drive mode for generating a moving light along a lighting path in a movement direction associated with the switching direction.

The preferred embodiments presented with respect to the method according to the invention and the advantages thereof correspondingly apply to the motor vehicle according to the invention.

Further features of the invention are apparent from the claims, the figures and the description of figures. All of the features and feature combinations mentioned above in the description as well as the features and feature combinations mentioned below in the description of figures and/or shown in the figures alone are usable not only in the respectively specified combination, but also in other combinations or else alone.

Now, the invention is explained in more detail based on a preferred embodiment as well as with reference to the attached drawings.

BRIEF DESCRIPTION OF THE DRAWINGS

There show.

DETAILED DESCRIPTION

Figure 1:
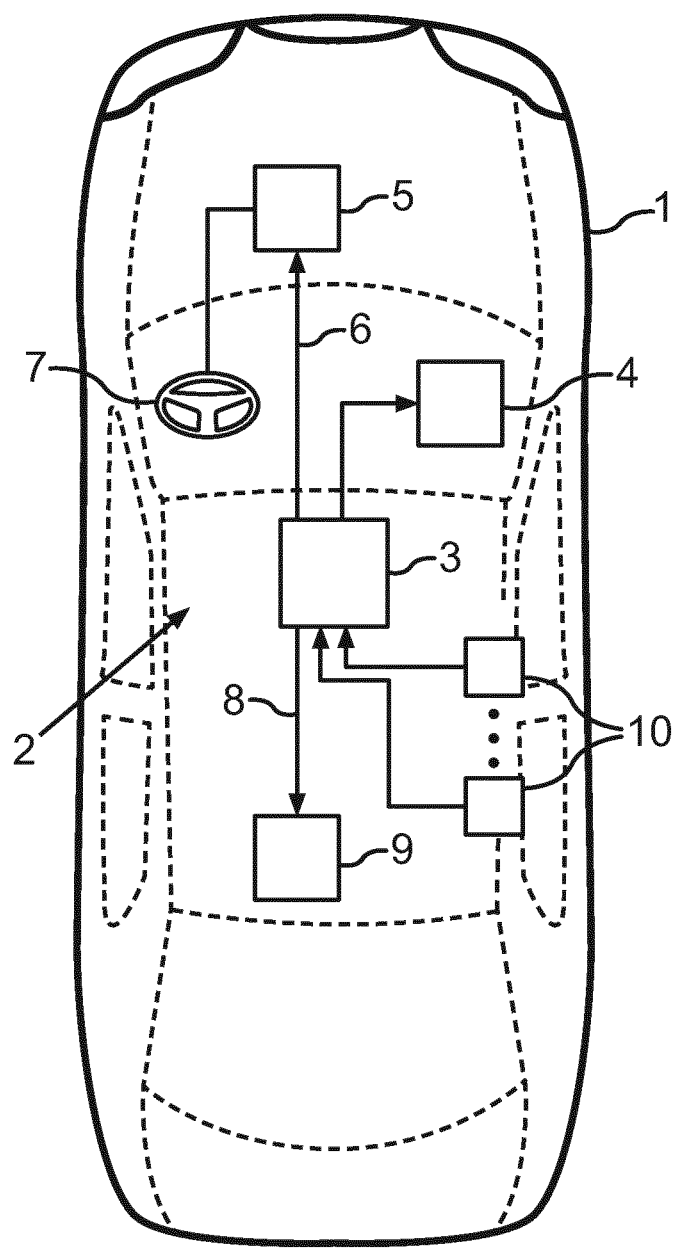
FIG. 1 in schematic illustration a motor vehicle with a driver assistance device according to an embodiment of the invention.

A motor vehicle 1 illustrated in FIG. 1 is for example a passenger car. The motor vehicle 1 includes a driver assistance device 2, which is formed for at least semi-automatically driving the motor vehicle 1. The driver assistance device 2 includes a control device 3, which is coupled to a lighting device 4 and controls it. The control device 3 is additionally coupled to a steering device 5 and can output control signals 6 to the steering device 5 in order to control the steering angle of the motor vehicle 1. In addition, a steering wheel 7 is connected to the steering device 5 as is schematically indicated in FIG. 1.

Optionally, the control device 3 can also output corresponding control signals 8 to a drive train 9 of the motor vehicle 1 in order to also control the longitudinal guidance of the motor vehicle 1. By outputting the control signals 8 to the drive train 9, the motor vehicle 1 can be accelerated and decelerated.

In addition, the control device 3 receives sensor data from a sensor device 10, which may include a plurality of sensors. For example, the sensor device 10 can include environmental sensors for detecting obstacles such as for example ultrasonic sensors and/or radar sensors and/or optical sensors. Additionally or alternatively, the sensor device 10 can also include sensors serving for detecting current environmental conditions in the environment of the motor vehicle 1. For example, it can be a rain sensor.

The driver assistance device 2 can be switched into an automatic drive mode such that an autopilot is virtually activated. In this automatic drive mode, the control device 3 controls at least the steering angle and thus the transverse guidance of the motor vehicle 1. This automatic drive mode can also again be deactivated by means of the control device 3 in autonomous manner and thus independently of the driver if a preset criterion is satisfied. This criterion can for example involve that a great degree of risk with respect to a collision with an obstacle and/or rain is detected based on the sensor data and/or a preset period of time since activation of the automatic drive mode has elapsed. However, before the automatic drive mode is deactivated and the manual drive mode is activated, a transition mode is activated, in which the control over the vehicle drive is to be passed to the driver. In this transition mode, the control device 3 examines whether or not the driver operates the steering wheel 7 and thus assumes the control over the motor vehicle 1. For this purpose, it can for example be examined if the steering wheel 7 is turned by the driver himself. Additionally or alternatively, touch sensors can also be disposed on the steering wheel 7, which are able to detect a touch of the steering wheel 7.

Figure 2:
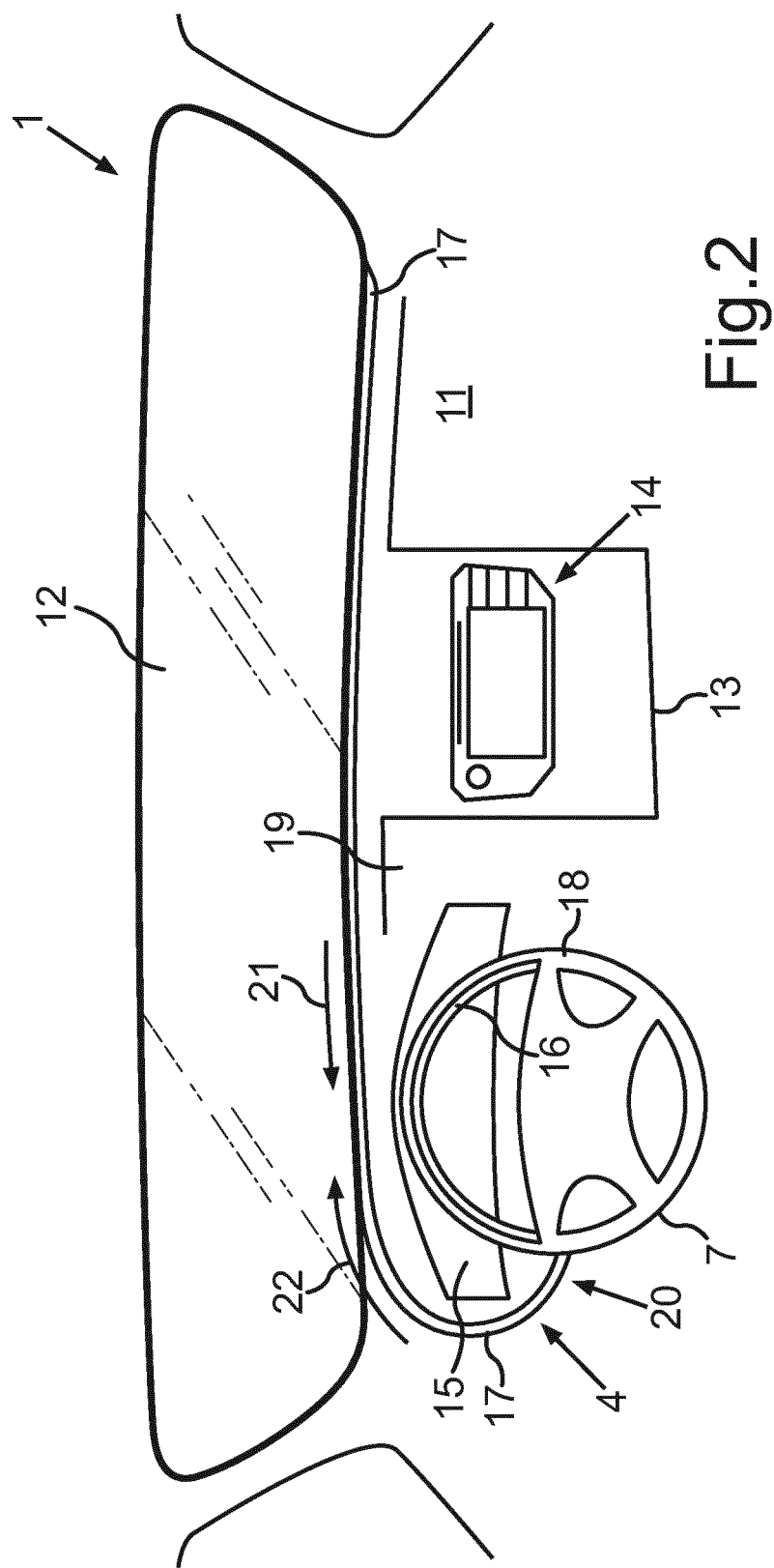
FIG. 2 in schematic illustration a front region of an interior of the motor vehicle for explaining a method according to an embodiment of the invention.

In FIG. 2, in schematic illustration, the front region of an interior 11 of the motor vehicle 1 is illustrated. In a manner known per se, the motor vehicle 1 has a windscreen 12, which is disposed in front of the steering wheel 7 in direction of travel. Between the driver's seat and the passenger seat, there is a center console 13 with an infotainment system 14. An instrument cluster 15 is disposed between the windscreen 12 and the steering wheel 7.

The lighting device 4 includes a first lighting unit 16 as well as a second lighting unit 17 in the embodiment. Both lighting units 16, 17 are formed in the form of a light bar and can each include a plurality of individual lighting elements, which are disposed next to each other. The first lighting unit 16 is disposed on the steering wheel 7 and acutely formed. Therein, the lighting unit 16 is disposed on a steering wheel rim 18, namely in the upper region of the steering wheel rim 18. Therein, the elongated configured lighting unit 16 extends substantially over half of the circumference of the steering wheel rim 18. The second lighting unit 17 is also elongated configured and disposed on a dashboard 19, namely immediately below the windscreen 12. The second lighting unit 17 also surrounds the instrument cluster 15 in certain areas such that the driver perceives the two lighting units 16, 17 substantially as one common lighting unit. In addition, the second lighting unit 17 extends in vehicle transverse direction over the predominant width region of the motor vehicle 1.

Overall, the two lighting units 16, 17 define a lighting path 20, along which a moving light is generated by means of the control device 3. At least the first lighting unit 16 can additionally be operated in various colors, in particular green, blue and red.

If the driver assistance device 2 is in the automatic drive mode, thus, only the first lighting unit 16 is activated. Therein, the second lighting unit 17 is deactivated. In the automatic drive mode, the first lighting unit 16 generates light signals, by which the activated automatic drive mode is optically signaled. Therein, the first lighting unit 16 can for example generate green light. This green light then signals that the automatic drive mode is activated.

If the above mentioned transition mode is activated by means of the control device 3, thus, the first lighting unit 16 generates a flashing light. In addition, the second lighting unit 17 is also activated, and the two lighting units 16, 17 are controlled by means of the control device 3 such that the mentioned moving light is generated along the lighting path 20 according to the arrow direction 22 from the steering wheel 7 towards the dashboard 19 and thus from the first lighting unit 16 towards the second lighting unit 17. Therein, the impression is generated that the light moves from the first lighting unit 16 towards the second lighting unit 17. Thus, the driver is made aware of the fact that he is to assume the control over the motor vehicle.

If it is then detected by means of the control device 3 that the driver has assumed the control or has operated the steering wheel 7, thus, light signals are generated by means of the first lighting unit 16, which signal this. For example, blue light is generated by means of the lighting unit 16. These blue light signals can then for example be maintained for a preset period of time, and after elapse of this period of time, the lighting device 4 can be again deactivated.

If after activation of the transition mode, it is determined by the control device 3 that a preset time interval after activation of the transition mode has elapsed and the driver has not assumed the control over the steering wheel 7, other light signals are output by means of the lighting unit 16, which request the driver to assume the control over the motor vehicle 1. These light signals can for example be provided in the form of a red light such that red light is generated by means of the first lighting unit 16.

Accordingly, overall three different types of light signals can be generated by means of the first lighting device 16, namely depending on the current driving situation:

Light signals of a first type—here, blue light is generated, which signals that after activation of the transition mode, the driver has properly assumed the control over the steering wheel 7;

Light signals of a second type—they are preferably provided in the form of a red light, by which the driver is requested to assume the vehicle drive if a preset time interval has elapsed after activation of the transition mode; and Light signals of a third type—they are realized by green light, which is output by means of the first lighting unit 16 in the activated automatic drive mode, if the control device 3 has the control over the motor vehicle 1.

As already explained, independently of the above mentioned light signals of the first, the second and the third type, a moving light is generated from the steering wheel 7 towards the dashboard 19 if the transition mode is activated. Correspondingly, it can also be provided that upon switching the driver assistance device 2 from the manual drive mode into the automatic drive mode, a corresponding moving light is generated in the inverse movement direction 21 from the second lighting unit 17 towards the first lighting unit 16. This moving light towards the steering wheel 7 then signals that the control device 3 assumes the control over the motor vehicle 1.

The invention claimed is:

1. A method for operating a driver assistance device of a motor vehicle, wherein the driver assistance device is switched between an automatic drive mode, in which control signals are output at least to a steering device of the motor vehicle by the driver assistance device and a steering angle of the motor vehicle is autonomously controlled by the driver assistance device, and a manual drive mode, in which the steering angle is manually controlled by a driver by operating a steering wheel of the motor vehicle, the method comprising:

switching the driver assistance device at least in one switching direction from one of the drive modes into the other drive mode; and as a result of the switching, generating a moving light along a predetermined lighting path in a movement direction associated with the switching direction by a lighting device.

2. The method according to claim 1, wherein the moving light is generated along a lighting path disposed on the steering wheel and/or outside of the steering wheel along a lighting path disposed partially on the steering wheel and partially outside of the steering wheel.

3. The method according to claim 1, wherein the moving light is generated by a lighting unit of the lighting device disposed on the steering wheel and/or a lighting unit of the lighting device disposed outside of the steering wheel by sequentially activating a plurality of lighting elements of the lighting unit disposed one after the other along the lighting path.

4. The method according to claim 1, wherein a region of the lighting path is disposed on a dashboard and/or a vehicle door of the motor vehicle.

5. The method according to claim 1, wherein when switching the driver assistance device from the manual drive mode into the automatic drive mode, the moving light is generated in a first movement direction from the outside of the steering wheel towards the steering wheel.

6. The method according to claim 5, wherein when switching the driver assistance device from the automatic drive mode into the manual drive mode, the moving light is generated in a second movement direction.

7. The method according to claim 5, wherein when switching the driver assistance device from the automatic drive mode into the manual drive mode, the moving light is generated from the steering wheel towards the outside of the steering wheel.

8. The method according to claim 7, wherein transition from the automatic drive mode into the manual drive mode is autonomously performed by a control device of the driver assistance device.

9. The method according to claim 8,
wherein when, after transitioning from the automatic drive mode into the manual drive mode, the operation of the steering wheel by the driver is detected by the driver assistance device, light signals of a first type different from the moving light are generated, thereby signaling the manual drive mode,
wherein when, after transitioning from the automatic drive mode into the manual drive mode, operation of the steering wheel by the driver is not detected by the driver assistance device within a preset time interval, light signals of a second type different from the moving light are generated, signaling the driver to assume the vehicle drive
wherein in the automatic drive mode, light signals of a third type different from the moving light are generated, by which the activated automatic drive mode is optically signaled,
wherein the light signals of the first type and/or the light signals of the second type and/or the light signals of the third type differ from each other in their coloring and/or in their flash frequency.

10. The method according to claim 7, wherein when, after transitioning from the automatic drive mode into the manual drive mode, the operation of the steering wheel by the driver is detected by the driver assistance device, light signals of a first type different from the moving light are generated, thereby signaling the manual drive mode.

11. The method according to claim 7, wherein when, after transitioning from the automatic drive mode into the manual drive mode, operation of the steering wheel by the driver is not detected by the driver assistance device within a preset time interval, light signals of a second type different from the moving light are generated, signaling the driver to assume the vehicle drive.

12. The method according to claim 5, wherein when switching the driver assistance device from the automatic drive mode into the manual drive mode, a transition mode is activated, in which the driver assistance device checks whether the driver operates the steering wheel, and wherein the moving light is generated in the transition mode.

13. The method according to claim 1, wherein in the automatic drive mode, light signals of a type different from the moving light are generated, by which the activated automatic drive mode is optically signaled.

14. A motor vehicle comprising:
a driver assistance device for autonomously driving the motor vehicle,
wherein the driver assistance device is switchable between an automatic drive mode and a manual drive mode and comprises:
a control device adapted to output control signals at least to a steering device of the motor vehicle in the automatic drive mode and to autonomously control a steering angle of the motor vehicle, and
wherein in the manual drive mode the steering angle is manually controllable by a driver by operating a steering wheel of the motor vehicle, and
a lighting device, wherein the control device is adapted to control the lighting device upon switching the driver assistance device at least in one switching direction from one of the drive modes into the other drive mode for generating a moving light along a predetermined lighting path in a movement direction associated with the switching direction.

\* \* \* \* \*